United States Patent
Savir et al.

(10) Patent No.: US 12,150,462 B2
(45) Date of Patent: *Nov. 26, 2024

(54) CULTURED MEAT-CONTAINING HYBRID FOOD

(71) Applicant: SuperMeat the Essence of Meat Ltd., Ness Ziona (IL)

(72) Inventors: Ido Savir, Herzliya (IL); Shir Friedman, Modiin-Maccabim-Reut (IL); Koby Barak, Ramat-Gan (IL)

(73) Assignee: SuperMeat the Essence of Meat Ltd., Ness Ziona (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,863

(22) Filed: Mar. 10, 2023

(65) Prior Publication Data

US 2023/0210133 A1    Jul. 6, 2023

Related U.S. Application Data

(63) Continuation of application No. 18/080,758, filed on Dec. 14, 2022, which is a continuation of application No. 16/497,833, filed as application No. PCT/IL2018/050398 on Apr. 4, 2018, now Pat. No. 11,589,598.

(60) Provisional application No. 62/483,399, filed on Apr. 9, 2017.

(51) Int. Cl.
*A23J 3/22*     (2006.01)
*A23J 3/16*     (2006.01)
*A23J 3/18*     (2006.01)
*A23L 13/60*    (2016.01)

(52) U.S. Cl.
CPC .......... *A23J 3/227* (2013.01); *A23J 3/16* (2013.01); *A23J 3/18* (2013.01); *A23L 13/65* (2016.08); *A23L 13/67* (2016.08)

(58) Field of Classification Search
CPC .......... A23L 13/00; A23L 13/65; A23L 13/67; A23J 3/227; A23J 3/18; A23J 3/16
USPC ........................................................ 426/645
See application file for complete search history.

(56) References Cited

U.S. PATENT DOCUMENTS

| | | |
|---|---|---|
| 6,835,390 B1 | 12/2004 | Vein |
| 9,332,779 B2 | 5/2016 | Marga |
| 9,700,067 B2 | 7/2017 | Fraser et al. |
| 11,589,598 B2 | 2/2023 | Savir et al. |
| 2006/0121006 A1 | 6/2006 | Chancellor et al. |
| 2011/0301249 A1 | 12/2011 | Challakere |
| 2015/0216216 A1 | 8/2015 | Marga |
| 2020/0100525 A1 | 4/2020 | Savir et al. |
| 2023/0115567 A1 | 4/2023 | Savir et al. |
| 2023/0210131 A1 | 7/2023 | Savir et al. |
| 2023/0210132 A1 | 7/2023 | Savir et al. |
| 2023/0210134 A1 | 7/2023 | Savir et al. |
| 2023/0210135 A1 | 7/2023 | Savir et al. |

FOREIGN PATENT DOCUMENTS

| | | |
|---|---|---|
| CN | 101132803 | 2/2008 |
| CN | 103747693 | 4/2014 |
| CN | 106282093 | 1/2017 |
| CN | 106413417 | 2/2017 |
| WO | WO 2006/041429 | 4/2006 |
| WO | WO 2013/010042 | 1/2013 |
| WO | WO 2013/016547 | 1/2013 |
| WO | WO 2015/161099 | 10/2015 |
| WO | WO 2018/189738 | 10/2018 |
| WO | WO 2021/033176 | 2/2021 |

OTHER PUBLICATIONS

Advisory Action Dated Jul. 26, 2022 from US Patent and Trademark Office Re. U.S. Appl. No. 16/497,833. (4 pages).
Advisory Action Dated Sep. 22, 2022 from US Patent and Trademark Office Re. U.S. Appl. No. 16/497,833. (7 pages).
Communication Pursuant to Article 94(3) EPC Dated Sep. 6, 2021 From the European Patent Office Re. Application No. 18732163.3. (8 Pages).
Corrected International Search Report and the Written Opinion Dated Jun. 29, 2018 From the International Searching Authority Re. Application No. PCT/IL2018/050398. (15 Pages).
English Translation Dated May 20, 2022 of Notice of Reasons for Rejection Dated May 10, 2022 From the Japan Patent Office Re. Application No. 2019-561788. (4 Pages).
Final Official Action Dated Jun. 2, 2022 from US Patent and Trademark Office Re. U.S. Appl. No. 16/497,833. (13 pages).
International Preliminary Report on Patentability Dated Mar. 3, 2022 From the International Bureau of WIPO Re. Application No. PCT/IL2020/050452. (14 Pages).
International Preliminary Report on Patentability Dated Oct. 24, 2019 From the International Bureau of WIPO Re. Application No. PCT/IL2018/050398. (10 Pages).
International Search Report and the Written Opinion Dated Oct. 19, 2020 From the International Searching Authority Re. Application No. PCT/IL2020/050452. (22 Pages).
International Search Report and the Written Opinion Dated Sep. 22, 2022 From the International Searching Authority Re. Application No. PCT/IL2022/050818. (19 Pages).
International Search Report and the Written Opinion Dated Jun. 29, 2018 From the International Searching Authority Re. Application No. PCT/IL2018/050398. (15 Pages).

(Continued)

*Primary Examiner* — Subbalakshmi Prakash

(57) ABSTRACT

A method of producing a hybrid foodstuff is provided. The method comprises combining a plant-originated substance with an amount of cultured animal cells so as to enhance a meat organoleptic and/or meat nutritional property in the hybrid foodstuff, wherein the animal cells do not form a tissue, and wherein the amount is below 30% (w/w) of the hybrid foodstuff.

7 Claims, No Drawings

(56) References Cited

OTHER PUBLICATIONS

Interview Summary Dated Aug. 23, 2022 From the US Patent and Trademark Office Rc. U.S. Appl. No. 16/497,833. (2 Pages).
Invitation to Pay Additional Fees, Communication Relating to the Results of the Partial International Search and the Provisional Opinion Dated Jul. 20, 2020 From the International Searching Authority Re. Application No. PCT/IL2020/050452. (17 Pages).
Notice of Allowance Dated Nov. 16, 2022 together with Interview Summary from the US Patent and Trademark Office Re. U.S. Appl. No. 16/497,833. (7 pages).
Notice of Reasons for Rejection Dated May 10, 2022 From the Japan Patent Office Re. Application No. 2019-561788. (5 Pages).
Notification of Office Action and Search Report Dated May 24, 2022 From the State Intellectual Property Office of the People's Republic of China Re. Application No. 201880034966.3 and Its Summary in English. (16 Pages).
Notification of Office Action Dated Nov. 16, 2022 From the State Intellectual Property Office of the People's Republic of China Re. Application No. 201880034966.3 and Its Summary in English. (8 Pages).
Office Action Dated Mar. 30, 2022 From the Israel Patent Office Re. Application No. 269949. (3 Pages).
Official Action Dated Nov. 12, 2021 from the US Patent and Trademark Office Re. U.S. Appl. No. 16/497,833. (9 pages).
Restriction Official Action Dated Jun. 1, 2021 from the US Patent and Trademark Office Re. U.S. Appl. No. 16/497,833. (13 pages).
Search Report and Written Opinion Dated Jan. 11, 2022 From the Intellectual Property Office of Singapore, IPOS Rc. Application No. 11201909184R. (7 Pages).
Search Report and Written Opinion Dated Jun. 16, 2020 From the Intellectual Property Office of Singapore, IPOS Re. Application No. 11201909184R. (13 Pages).
Translation Dated Jul. 4, 2022 of Notification of Office Action Dated May 24, 2022 From the State Intellectual Property Office of the People's Republic of China Re. Application No. 201880034966.3. (8 Pages).
Written Opinion Dated Mar. 23, 2021 From the Intellectual Property Office of Singapore, IPOS Re. Application No. 11201909184R. (10 Pages).
Dhandapani et al. "A General Platform for Antibody Purification Utilizing Engineered-Micelles", mABS, XP055711155, 11(3): 583-592, Published Online Feb. 6, 2019.
Dhandapani et al. "Conjugated Detergent Micelles as A Platform for IgM Purification", Biotechnology and Bioengineering, 119(7): 1997-2003, Mar. 24, 2022.
Dhandapani et al. "Detergent Micelle Conjugates Containing Amino Acid Monomers Allow Purification of Human IgG Near Neutral pH", Journal of Chromatography B, 1206: 1-5, Jun. 28, 2022.
Dhandapani et al. "Nonionic Detergent Micelle Aggregates: An Economical Alternative to Protein A Chromatography", New Biotechnology, 61: 90-98,Dec. 3, 2021.
Dhandapani et al. "Purification of Antibody Fragments via Interaction with Detergent Micellar Aggregates", Scientific Reports, 11: 1-11, Jun. 3, 2021.
Dhandapani et al. "Role of Amphiphilic [Metal: Chelator] Complexes in a Non-Chromatographic Antibody Purification Platform", Journal of Chromatography B: Biomedical Sciences & Applications, XP085922155, 1133: 121830-1-121830-10, Available Online Oct. 21, 2019.
Hoogenkamp "Building a Better Hybrid Burger. New Technologies Open New Possibilities for the Production of Burgers—Part 2", FleischWirtschaft International, Product Development, p. 80-88, Feb. 2013.
Kaspar et al. "Sensory Evaluation of Sausages With Various Proportions of Cyprinus Carpio Meat", Czech Journal of Food Sciences, 33(1): 45-51, Feb. 2015.
Krona et al. "Developing Cultured Meat Scaffolds of Extruded Vegetable-Based Proteins", Annual Transactions of the Nordic Rheology Society, 25: 311-313, Apr. 3-6, 2017.
Translation Dated Apr. 14, 2023 of Decision on Rejection Dated Apr. 16, 2023 From the State Intellectual Property Office of the People's Republic of China Re. Application No. 201880034966.3. (5 pages).
Official Action Dated Jul. 20, 2023 from the US Patent and Trademark Office Re. U.S. Appl. No. 18/119,857. (19 pages).
English Summary Dated Mar. 27, 2023 of Decision on Rejection Dated Mar. 16, 2023 From the State Intellectual Property Office of the People's Republic of China Re. Application No. 201880034966.3. (2 pages).
Decision on Rejection Dated Mar. 16, 2023 From the State Intellectual Property Office of the People's Republic of China Re. Application No. 201880034966.3. (5 Pages).
Communication Pursuant to Rule 114(2) EPC Dated Jun. 19, 2023 From the European Patent Office Re. Application No. 18726235.7. (3 Pages).
Official Action Dated Oct. 26, 2023 from the US Patent and Trademark Office Re. U.S. Appl. No. 18/119,858. (28 pages).
Official Action Dated Jul. 7, 2023 from the US Patent and Trademark Office Re. U.S. Appl. No. 18/080,758. (19 pages).
Official Action Dated Jan. 29, 2024 from the US Patent and Trademark Office Re. U.S. Appl. No. 18/080,758. (14 pages).
Official Action Dated Feb. 12, 2024 from the US Patent and Trademark Office Re. U.S. Appl. No. 18/119,857. (16 pages).
Official Action Dated Feb. 15, 2024 from the US Patent and Trademark Office Re. U.S. Appl. No. 18/119,867. (23 pages).
Official Action Dated Mar. 28, 2024 from the US Patent and Trademark Office Re. U.S. Appl. No. 18/119,866. (31 pages).

US 12,150,462 B2

CULTURED MEAT-CONTAINING HYBRID FOOD

RELATED APPLICATIONS

This application is a Continuation of U.S. patent application Ser. No. 18/080,758, filed on Dec. 14, 2022, which is a Continuation of U.S. patent application Ser. No. 16/497,833 filed on Sep. 26, 2019, now U.S. Pat. No. 11,589,598, which is a National Phase of PCT Patent Application No. PCT/IL2018/050398 having International Filing Date of Apr. 4, 2018, which claims the benefit of priority under 35 USC § 119(e) of U.S. Provisional Patent Application No. 62/483,399 filed on Apr. 9, 2017. The contents of the above applications are all incorporated by reference as if fully set forth herein in their entirety.

FIELD AND BACKGROUND OF THE INVENTION

The present invention, in some embodiments thereof, relates to cultured meat-containing hybrid food.

In recent years, attempts have been made to bring natural taste, odor, appearance and nutritional value of meat to the process of vegetarian food preparation, under the fields of food science, food technology and molecular gastronomy.

Cultured meat, also called synthetic meat, cell-cultured meat, clean meat, and in vitro meat, is meat grown in cell culture instead of inside animal, see Verbeke, Wim, Pierre Sans, and Ellen J. Van Loo. "Challenges and prospects for consumer acceptance of cultured meat." *Journal of Integrative Agriculture* 14.2 (2015): 285-294, which is incorporated herein as a reference. Several patent documents describe a variety of cultured meat consumable products and related method: US patent app. Nos. 2005010965, 2006121006, and 2006029922 disclose process for production and cultured meat which comprises muscle cells that are grown ex vivo attached to either 2D or 3D support structure and further comprises other cells such as fat cells or cartilage cells, or both, that are grown ex vivo together with the muscle cells. The visual appearance (including color), smell, texture taste and price-per-product of the cultured meat published in the art is not yet satisfying, see Post, Mark J. "Cultured meat from stem cells: Challenges and prospects."*Meat Science* 92.3 (2012): 297-301; Verbeke, Wim, et al. "'Would you eat cultured meat?': Consumers' reactions and attitude formation in Belgium, Portugal and the United Kingdom."*Meat science* 102 (2015): 49-58; and Forgacs, Gabor, Francoise Marga, and Karoly Robert Jakab. "Engineered comestible meat." U.S. Pat. No. 8,703,216. 22 Apr. 2014, all incorporated herein as a reference.

It therefore remains a long felt and unmet need to provide a novel non-meat production method which is more cost-efficient than the current methods of production and non-meat products which are healthier having an improved meaty flavor and appearance.

Additional Background Art

US Patent Application Publication No. 20060121006;
U.S. Pat. No. 9,332,779;
US Patent Application Publication No. 20110301249

SUMMARY OF THE INVENTION

According to an aspect of some embodiments of the present invention there is provided a method of producing a hybrid foodstuff, the method comprising combining a plant-originated substance with an amount of cultured animal cells so as to enhance a meat organoleptic and/or meat nutritional property in the hybrid foodstuff, wherein the animal cells do not form a tissue, and wherein the amount is below 30% (w/w) of the hybrid foodstuff.

According to an aspect of some embodiments of the present invention there is provided a method of providing nutrition to a subject in need thereof, the method comprising providing the subject with a hybrid foodstuff comprising a plant-originated substance and an amount of cultured animal cells so as to enhance a meat organoleptic and/or meat nutritional property in the hybrid foodstuff, wherein the animal cells do not form a tissue, and wherein the amount is below 30% (w/w) of the hybrid foodstuff.

According to some embodiments of the invention, the subject is at risk of nutritional deficiency.

According to an aspect of some embodiments of the present invention there is provided a method of qualifying a hybrid foodstuff, the method comprising subjecting the hybrid foodstuff to at least one organoleptic test.

According to an aspect of some embodiments of the present invention there is provided a hybrid foodstuff comprising a plant-originated substance and an amount of cultured animal cells so as to enhance a meat organoleptic and/or meat nutritional property in the hybrid foodstuff, wherein the animal cells do not form a tissue, and wherein the amount is below 30% (w/w) of the hybrid foodstuff.

According to some embodiments of the invention, the hybrid foodstuff comprises from about 82% to about 99.5% (w/w) plant-originated substance and/or additives thereof and about 0.5% to about 18% (w/w) cultured animal cells.

According to some embodiments of the invention, the amount is minimal weight percent.

According to some embodiments of the invention, the amount provides the hybrid foodstuff with one 9-PHS point more than a corresponding foodstuff devoid of the animal cells.

According to some embodiments of the invention, the foodstuff comprises about 70% to about 99.7% (w/w) plant-originated substances and/or additives thereof (vegetable portion) and water immiscible materials (oil portion), ranging from about 0.3% to 30% (w/w), where the improvement is that the oil portion consists of about 30% (w/w) or less vegetable oil, and from about 0.3% to about 30% (w/w) cultured animal cells.

According to some embodiments of the invention, the cultured animal cells are selected from the group consisting of hepatocytes, myoblasts, osteoblasts, fibroblasts, lipoblasts, odontoblasts, adult neuronal progenitor cells, neural stem cells, multipotent stem cells from subventricular forebrain region, ependymal-derived neural stem cells, hematopoietic stem cells, liver-derived hematopoietic stem, marrow-derived stem cell, adipo-fibroblasts, adipose-derived stem cells, islet-cells producing stem cells, pancreatic-derived pluripotent islet-producing stem cells, mesenchymal stem cells, placenta cells, bone marrow stromal cells, muscle side population cells, bone marrow-derived recycling cells, blood-derived mesenchymal precursor cells, bone-marrow derived side population cells, muscle precursor cells, circulating skeleton stem cells, neural progenitor cells, multipotent adult progenitor cells, mesodermal progenitor cells, spinal cord progenitor cells and spore-like cell, and any combinations thereof.

According to some embodiments of the invention, the hybrid foodstuff has the organoleptic properties of a meat product, selected from the group consisting of a chicken, duck, pork and beef.

According to some embodiments of the invention, the hybrid foodstuff comprises less than about 0.5 gr per 100 gr saturated fat, less than about 60 mg per 100 gr cholesterol and less than about 220 mg per 100 gr sodium.

According to some embodiments of the invention, the animal cells are of a single cell type or single cell lineage.

According to some embodiments of the invention, the animal cells are of no more than two cell types or two cell lineages.

According to some embodiments of the invention, the animal cells are of no more than three cell types or three cell lineages.

According to some embodiments of the invention, the foodstuff is free of growth hormones in an amount hazardous for human or animal consumption.

According to an aspect of some embodiments of the present invention there is provided a hybrid foodstuff comprising from about 82% to about 99.5% (w/w) plant-originated substances and additives thereof and about 0.5% to about 18% (w/w) cultured meat.

According to an aspect of some embodiments of the present invention there is provided a hybrid foodstuff as described herein, wherein the portion of the cultured meat in the end product is defined as the minimal weight percent providing the end product with one 9-PHS point more than the corresponding foodstuff being non-hybrid, cultured meat free vegetable-based product.

According to an aspect of some embodiments of the present invention there is provided a hybrid foodstuff with improved organoleptic and nutritional properties, comprising about 70% to about 99.7% (w/w) plant-originated substances and additives thereof (vegetable portion) and water immiscible materials (oil portion), ranging from about 0.3% to 30% (w/w), where the improvement is that the oil portion consists of about 30% (w/w) or less vegetable oil, and from about 0.3% to about 30% (w/w) cultured meat.

According to an aspect of some embodiments of the present invention there is provided a hybrid foodstuff with improved organoleptic and nutritional properties, comprising about 70% to about 99.7% (w/w) plant-originated substances and additives thereof (vegetable portion) and water immiscible materials (oil portion), ranging from about 3% to 30% (w/w), where the improvement is that the oil portion consists of about 30% (w/w) or less vegetable oil, and from about 0.3% to about 30% (w/w) cultured meat; wherein the smallest portion of the cultured meat in the end product is defined as the minimal weight percent providing the end product with at least one 9-PHS point more than a corresponding foodstuff being non-hybrid, cultured meat free vegetable-based product.

According to an aspect of some embodiments of the present invention there is provided a hybrid foodstuff with improved organoleptic and nutritional properties, characterized by about 70% to about 99.7% (w/w) plant-originated substances and additives thereof (vegetable portion) and water immiscible materials (oil portion), ranging from about 3% to 30% (w/w); the oil portion consists of up to about 30% (w/w) or less vegetable oil, and from about 0.3% to about 30% (w/w) cultured meat; wherein the role the mixtures in the oil portion (measured as vegetable oil to culture meat (wt/wt) in improving the organoleptic properties (measured as 9-PHS) of the hybrid foodstuff of is provided by any of Formula I, II or III.

According to an aspect of some embodiments of the present invention there is provided a hybrid foodstuff with improved organoleptic and/or nutritional properties, characterized by about 70% to about 99.7% (w/w) plant-originated substances and additives thereof (e.g., gum, binding, thickening, aroma flavor additives) and/or water immiscible materials (oil portion), ranging from about 3% to 30% (w/w), where the improvement is that the additives thereof (e.g., gum, binding, thickening, aroma flavor additives) and/or water immiscible materials (oil portion) consists of about 30% (w/w) or less vegetable oil, and from about 0.3% to about 30% (w/w) cultured meat.

According to an aspect of some embodiments of the present invention there is provided a hybrid foodstuff as described herein, wherein at least about 50% of cultured meat portion is cultured meat cells selected from a group consisting of heme-proteins (HPs), hepatocytes, myoblasts, osteoblasts, fibroblasts, lipoblasts, odontoblasts, adult neuronal progenitor cells, neural stem cells, multipotent stem cells from subventricular forebrain region, ependymal-derived neural stem cells, hematopoietic stem cells, liver-derived hematopoietic stem, marrow-derived stem cell, adipo-fibroblasts, adipose-derived stem cells, islet-cells producing stem cells, pancreatic-derived pluripotent islet-producing stem cells, mesenchymal stem cells, placenta cells, bone marrow stromal cells, muscle side population cells, bone marrow-derived recycling cells, blood-derived mesenchymal precursor cells, bone-marrow derived side population cells, muscle precursor cells, circulating skeleton stem cells, neural progenitor cells, multipotent adult progenitor cells, mesodermal progenitor cells, spinal cord progenitor cells and spore-like cell, mixtures and any combinations thereof.

According to an aspect of some embodiments of the present invention there is provided a hybrid foodstuff as described herein, wherein the foodstuff is a consumable, edible item having the final organoleptic properties of a meat product, and especially a product selected from the group consisting of Beef, Beef heart, Beef liver, Beef tongue, Bone soup from allowable meats, Buffalo, Bison, Calf liver, Caribou, Goat, Ham, Horse, Kangaroo, Lamb, Marrow soup, Moose, Mutton, Opossum, Organ Meats, Pork, Bacon, Rabbit, Snake, Squirrel, Sweetbreads, Tripe, Turtle, Veal, Venison, Chicken, Chicken Liver, Cornish Game Hen, Duck, Duck Liver, Emu, Gizzards, Goose, Goose Liver, Grouse, Guinea Hen, Liver, Ostrich, Partridge, Pheasant, Quail, Squab, Turkey, any mixture and a combination thereof.

According to an aspect of some embodiments of the present invention there is provided a meat-flavored hybrid foodstuff-based diet free of harmful substances at harmful quantities; wherein the harmful substances including saturated fat, cholesterol and sodium; wherein harmful quantities are 5 g/d, <200 mg and 400 mg/d, respectfully; and wherein the each of the hybrid foodstuff comprising from about 82% to about 99% (w/w) plant-originated substances and additives thereof and about 1% to about 18% (w/w) cultured meat.

According to an aspect of some embodiments of the present invention there is provided a beef-flavored hybrid foodstuff free of harmful substances at harmful quantities; wherein the harmful substances including cholesterol, total fat and saturated fat; wherein harmful quantities are <60 mg, <8 gr and <3.5 gr per 100 gr, respectfully; and wherein the beef-flavored hybrid foodstuff comprises from about 82% to about 99% (w/w) plant-originated substances and additives thereof and about 1% to about 18% (w/w) cultured meat.

According to an aspect of some embodiments of the present invention there is provided a pork-flavored hybrid foodstuff free of harmful substances at harmful quantities; wherein the harmful substances including cholesterol, total fat and saturated fat; wherein harmful quantities are <60 mg, <5 gr and <1 gr per 100 g, respectfully; and wherein the pork-flavored hybrid foodstuff comprises from about 82% to about 99% (w/w) plant-originated substances and additives thereof and about 1% to about 18% (w/w) cultured meat.

According to an aspect of some embodiments of the present invention there is provided a chicken-flavored hybrid foodstuff free of harmful substances at harmful quantities; wherein the harmful substances including cholesterol, total fat and saturated fat; wherein harmful quantities are <60 mg, <4 gr and <0.5 gr per 100 gr, respectfully; and wherein the chicken-flavored hybrid foodstuff comprises from about 82% to about 99% (w/w) plant-originated substances and additives thereof and about 1% to about 18% (w/w) cultured meat.

According to an aspect of some embodiments of the present invention there is provided a duck-flavored hybrid foodstuff free of harmful substances at harmful quantities; wherein the harmful substances including cholesterol, total fat and saturated fat; wherein harmful quantities are <60 mg, <4 gr and <0.5 gr per 100 gr, respectfully; and wherein the duck-flavored hybrid foodstuff comprises from about 82% to about 99% (w/w) plant-originated substances and additives thereof and about 1% to about 18% (w/w) cultured meat.

According to an aspect of some embodiments of the present invention there is provided a method of preparing a hybrid foodstuff comprising the steps of:
 providing a plant-originated substance;
 providing cultured meat, cells and substances thereof;
 interconnecting the plant-originated substance with the cultured meat, cells and substances thereof; and
 forming the hybrid foodstuff product into a desired form.

According to some embodiments of the invention, the plant-originated substance is from about 82% to about 99.5% (w/w).

According to some embodiments of the invention, the cultured meat, cells and substances thereof is from about 0.5% to about 18% (w/w).

According to an aspect of some embodiments of the present invention there is provided a method of preparing a hybrid foodstuff comprising the steps of:
 providing a plant-originated substance;
 providing water immiscible materials;
 providing cultured meat, cells and substances thereof;
 interconnecting the plant-originated substance with the cultured meat, cells and substances thereof and with the water immiscible materials; and
 forming the hybrid foodstuff product into a desired form.

According to some embodiments of the invention, the plant-originated substance is from about 70% to about 99.7% (w/w).

According to some embodiments of the invention, the water immiscible materials is from about 3% to 30% (w/w).

According to some embodiments of the invention, the cultured meat, cells and substances thereof is from about 0.3% to about 30% (w/w).

According to some embodiments of the invention, at least about 50% of cultured meat portion are hepatocytes.

According to some embodiments of the invention, at least about 50% of cultured meat portion is cultured meat cells selected from a group consisting of heme-proteins (HPs), hepatocytes, myoblasts, osteoblasts, fibroblasts, lipoblasts, odontoblasts, adult neuronal progenitor cells, neural stem cells, multipotent stem cells from subventricular forebrain region, ependymal-derived neural stem cells, hematopoietic stem cells, liver-derived hematopoietic stem, marrow-derived stem cell, adipo-fibroblasts, adipose-derived stem cells, islet-cells producing stem cells, pancreatic-derived pluripotent islet-producing stem cells, mesenchymal stem cells, placenta cells, bone marrow stromal cells, muscle side population cells, bone marrow-derived recycling cells, blood-derived mesenchymal precursor cells, bone-marrow derived side population cells, muscle precursor cells, circulating skeleton stem cells, neural progenitor cells, multipotent adult progenitor cells, mesodermal progenitor cells, spinal cord progenitor cells and spore-like cell, mixtures and any combinations thereof.

According to some embodiments of the invention, the foodstuff is a consumable, edible item having the final organoleptic properties of a meat product, and especially a product selected from the group consisting of Beef, Beef heart, Beef liver, Beef tongue, Bone soup from allowable meats, Buffalo, Bison, Calf liver, Caribou, Goat, Ham, Horse, Kangaroo, Lamb, Marrow soup, Moose, Mutton, Opossum, Organ Meats, Pork, Bacon, Rabbit, Snake, Squirrel, Sweetbreads, Tripe, Turtle, Veal, Venison, Chicken, Chicken Liver, Cornish Game Hen, Duck, Duck Liver, Emu, Gizzards, Goose, Goose Liver, Grouse, Guinea Hen, Liver, Ostrich, Partridge, Pheasant, Quail, Squab, Turkey, any mixture and a combination thereof.

According to some embodiments of the invention, the animal-derived protein in the hybrid foodstuff is below 50% (w/w).

According to some embodiments of the invention, the foodstuff is not a chip and the plant-originated substance is not a plant derived hydrogel.

According to some embodiments of the invention, the hybrid foodstuff comprises the hybrid foodstuff as described herein.

According to some embodiments of the invention, the foodstuff is a vegetarian foodstuff.

According to some embodiments of the invention, the foodstuff is a vegan foodstuff.

According to some embodiments of the invention, the foodstuff is a meat substitute.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

DESCRIPTION OF SPECIFIC EMBODIMENTS
OF THE INVENTION

The present invention, in some embodiments thereof, relates to cultured meat-containing hybrid food.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

Whilst reducing the present invention to practice, the present inventors realized that enriching vegetarian foods with in vitro-cultured isolated animal cells that do not attempt to mimic a tissue structure can enhance organoleptic properties and nutritional properties of foods that are based essentially on plant-originated substances.

As used herein the term "organoleptic properties" refers to the aspects of food, that a consumer experiences via the senses-including taste, sight, smell or touch.

For example, adipocytes may be used to confer a non-meat food with a meaty taste and/or texture (e.g., beef or chicken) when cooked or grilled.

Cardiomyocytes may be used to confer a non-meat food with a texture of meat as well as taste (e.g., bitter/metal) of meat.

Erythrocytes may confer a non-meat food with a grilled meat (e.g., beef or chicken) taste as well as meaty color (e.g., beef).

Hepatocytes may confer a non-meat food with meaty color (e.g., beef) as well as enrich the taste of meat.

The term "meat" is meant to encompass any animal flash that is eaten as food (e.g., beef, pork, poultry, fish as well as additional examples which are provided hereinbelow).

In this case, the organoleptic property is that of meat. For instance, when referring to taste, an organoleptic property may be an umami taste.

As used herein "nutritional properties" refer to the composition of meat that is of valuable to the subject feeding on it.

For muscle tissue is very high in protein, containing all of the essential amino acids, and in most cases is a good source of zinc, vitamin $B_{12}$, selenium, phosphorus, niacin, vitamin $B_6$, choline, riboflavin and iron. Several forms of meat are also high in vitamin K. Muscle tissue is very low in carbohydrates and does not contain dietary fiber. Proteins, vitamins, and minerals are available from almost any source of meat and are generally consistent.

The fat content of meat can vary widely depending on the species and breed of animal, the way in which the animal was raised, including what it was fed, the anatomical part of the body, and the methods of butchering and cooking. Wild animals such as deer are typically leaner than farm animals, leading those concerned about fat content to choose game such as venison. The fatty deposits that exist with the muscle fibers in meats soften when it is cooked and improve the flavor through chemical changes initiated through heat that allow the protein and fat molecules to interact. The fat, when cooked with meat, also makes the meat seem juicier. However, the nutritional contribution of the fat is mainly calories as opposed to protein. As fat content rises, the meat's contribution to nutrition declines. In addition, there is cholesterol associated with fat surrounding the meat. The cholesterol is a lipid associated with the kind of saturated fat found in meat.

Table A below compares the nutritional content of several types of meat (per 110 gr). While each kind of meat has about the same content of protein and carbohydrates, there is a very wide range of fat content.

TABLE A

| Source | Calories | Protein (gr) | Carbs (gr) | Fat (gr) |
|---|---|---|---|---|
| Fish | 110-140 | 20-25 | 0 | 1-5 |
| Chicken breast | 160 | 28 | 0 | 7 |
| Lamb | 250 | 30 | 0 | 14 |
| Steak (beef top round) | 210 | 36 | 0 | 7 |
| Steak (beef T-bone) | 450 | 25 | 0 | 35 |

Other major nutritional ingredients and their sources are provided hereinbelow: Vitamin B12, which is mainly found in fish, meat, poultry and dairy products. Vitamin D, which is found in oily fish, eggs and dairy.

Docosahexaenoic acid (DHA), which is an essential omega-3 fat found in fatty fish.

Heme-iron, which is predominantly found in meat, especially red meat.

Zinc, which is mainly found in animal protein sources, such as beef, pork and lamb.

Hence, the improvement/enhancement in nutritional property can be in any of protein, calories, fat, vitamins, minerals such as listed herein.

As used herein "enhancement", "increase", "augmentation" refers to an addition of at least 10%, 15%, 20%, 25%, 30%, 35%, 40%, 45%, 50%, 55%, 60%, 65%, 70%, 75%, 80%, 85%, 90% 95% 100%, 200%, 300%, 400%, 500%, 600%, 700%, 800%, 900% or 1000% (e.g., by weight or by score) of the organoleptic or nutritional property as compared to the same food without the cultured meat cells or in which a portion has been substituted with an equivalent amount of cultured meat cells (e.g., lipid portion, hydrolysate, synthetic additives etc.), as described below.

The terms 'hybrid food' and 'products' thereof refer hereinafter to a foodstuff or a portion of a foodstuff comprising at least one first non-meat significantly high portion and at least one second cultured meat low portion, combined (e.g., interconnected) with said at least one first non-meat portion.

According to a specific embodiment, the non-meat is a plant originated substance(s).

According to a specific embodiment, the non-meat is a non-plant originated substances (e.g., minerals, synthetic substance(s)).

According to a specific embodiment, the non-meat is selected from the group consisting of a plant originated substance(s) and non-plant-originated substance(s).

According to a specific embodiment, the foodstuff is a vegetarian foodstuff.

According to a specific embodiment, the foodstuff is a vegan foodstuff.

According to a specific embodiment, the foodstuff comprises a meat substitute or is generally consumed as a meat substitute (plant-based).

According to a specific embodiment, the animal cells are of a single cell type or single cell lineage.

As used herein "cell lineage" refers to any of endoderm, mesoderm and endoderm.

According to a specific embodiment, the animal cells are of no more than two cell types or two cell lineages.

According to a specific embodiment, the animal cells are of no more than three or four cell types.

According to a specific embodiment, the hybrid foodstuff is free of bodily fluids e.g., saliva, serum, plasma, mucus, urine, feces, tears, milk etc. As used herein "animal cells" refer to "non-human cells".

The term 'foodstuff' refers hereinafter to any substance with food value; the term further refers to the raw material of food before, within the process and after processing, the food product or portions thereof (e.g., the coating of an edible item such as a schnitzel), by-product(s) and end-product (e.g., sausage, ground meat, schnitzel etc.) thereof. In the present invention, there are provided three families of foodstuffs: plant-originated foodstuffs and substances thereof, and cultured meat, cells and substances thereof, both are known in the art; and the novel hybrid foodstuff which comprises a majority (above 50% w/w) of said plant-originated substances and a minority (below 50% w/w) of cultured meat, cells and substances thereof interconnected with said plant-originated substances to form a unified foodstuff with an improved organoleptic and nutritional value.

According to an embodiment of the invention the hybrid foodstuff is an end article of manufacture (product) to be consumed by a human or non-human subject.

It will be appreciated that food refers to food or feed (animal feeding).

As used herein "cultured animal cells" refers to any non-human cell (e.g., mammals, avian, insect, fish) that is cultured in vitro but is not allowed to form a tissue in vitro.

The cells can be wild-type cells or genetically modified cells (e.g., transgenic, genome edited).

The term "cultured meat" is interchangeably used with "cultured animal cells".

According to a specific embodiment, the cultured animal cells are terminally differentiated.

According to a specific embodiment, the cultured animal cells are partially differentiated (e.g., blood-derived mesenchymal precursor cells, neural progenitor cells, multipotent adult progenitor cells, mesodermal progenitor cells, spinal cord progenitor cells).

According to a specific embodiment, the cultured animal cells are stem cells (e.g., neural stem cells, multipotent stem cells from subventricular forebrain region, ependymal-derived neural stem cells, hematopoietic stem cells, liver-derived hematopoictic stem, marrow-derived stem cell, adipose-derived stem cells, islet-cells producing stem cells, pancreatic-derived pluripotent islet-producing stem cells, mesenchymal stem cells).

According to a specific embodiment, the cells are stem cells selected from the group consisting of mesenchymal stem cells and embryonic stem cells.

The phrase "embryonic stem cells" refers to embryonic cells which are capable of differentiating into cells of all three embryonic germ layers (i.e., endoderm, ectoderm and mesoderm), or remaining in an undifferentiated state. The phrase "embryonic stem cells" may comprise cells which are obtained from the embryonic tissue formed after gestation (e.g., blastocyst) before implantation of the embryo (i.e., a pre-implantation blastocyst), extended blastocyst cells (EBCs) which are obtained from a post-implantation/pre-gastrulation stage blastocyst (see WO2006/040763), embryonic germ (EG) cells which are obtained from the genital tissue of a fetus, and cells originating from an unfertilized ova which are stimulated by parthenogenesis (parthenotes).

Induced pluripotent stem cells (iPS; embryonic-like stem cells), are cells obtained by de-differentiation of adult somatic cells which are endowed with pluripotency (i.e., being capable of differentiating into the three embryonic germ cell layers, i.e., endoderm, ectoderm and mesoderm). According to some embodiments of the invention, such cells are obtained from a differentiated tissue (e.g., a somatic tissue such as skin) and undergo de-differentiation by genetic manipulation which re-program the cell to aquire embryonic stem cells characteristics.

The phrase "adult stem cells" (also called "tissue stem cells" or a stem cell from a somatic tissue) refers to any stem cell derived from a somatic tissue [of either a postnatal or prenatal animal (especially the human)]. The adult stem cell is generally thought to be a multipotent stem cell, capable of differentiation into multiple cell types. Adult stem cells can be derived from any adult, neonatal or fetal tissue such as adipose tissue, skin, kidney, liver, prostate, pancreas, intestine, bone marrow and placenta.

Hematopoietic stem cells, which may also referred to as adult tissue stem cells, include stem cells obtained from blood or bone marrow tissue of an individual at any age or from cord blood of a newborn individual.

Placental and cord blood stem cells may also be referred to as "young stem cells".

Mesenchymal stem cells are multipotent stromal cells that can differentiate into a variety of cell types, including osteoblasts (bone cells), chondrocytes (cartilage cells), myocytes (muscle cells) and adipocytes (fat cells which give rise to marrow adipose tissue). The term encompasses multipotent cells derived from the marrow as well as other non-marrow tissues, such as placenta, umbilical cord blood, adipose tissue, adult muscle, corneal stroma or the dental pulp of deciduous baby teeth. The cells do not have the capacity to reconstitute an entire organ.

According to a specific embodiment, the cells are selected from the group consisting of erythrocytes, adipocytes, cardiomyocytes and hepatocytes.

According to a specific embodiment, the cells are erythrocytes.

According to a specific embodiment, the cells are adipocytes.

According to a specific embodiment, the cells are hepatocytes.

According to a specific embodiment, the cells are cardiomyocytes.

According to a specific embodiment, the cells are of domesticated animals, such as listed below (e.g., duck, chicken).

According to a specific embodiment, the cells are produced by in vitro expansion e.g., stem cell expansion.

According to a specific embodiment, the cells are produced by in vitro differentiation.

Methods of cell differentiation are well known in the art.

Generally these methods are based on adherent cultures or suspension cultures, each of which is contemplated herein.

According to a specific embodiment, the cells are produced in a suspension culture.

In vitro meat can be produced by culturing the cells from farm animal species in large quantities starting from a relatively small number. Culturing satellite cells and even more so embryonic stem cells are typically for this purpose since these cells have an almost infinite self-renewal capacity. Recent reports have shown the establishment of stem-cell lines from domesticated ungulate animals e.g., non-human, rat, mouse (Challenges and prospects for the establishment of embryonic stem cell lines of domesticated ungulates. Anim Reprod Sci. 2007; 98(1-2):147-168. doi: 10.1016/j.anireprosci.2006.10.009., which is hereby incorporated by reference). Bach et al. (Engineering of muscle tissue. Clin Plast Surg. 2003; 30(4):589-599. doi: 10.1016/S0094-1298(03)00077-4.) suggested myosatellite cells as the preferred source of primary myoblasts because they recapitulate myogenesis more closely than immortal myogenic cell lines. Myosatellite cells have been isolated and characterized from the skeletal muscle tissue of cattle (Dodson et al. Optimization of bovine satellite cell derived myotube formation in vitro. Tissue Cell. 1987; 19(2):159-166. doi: 10.1016/0040-8166(87)90001-2.), chicken (Yablonka-Reuveni et al. Dev Biol. 1987; 119(1):252-259. doi: 10.1016/0012-1606(87)90226-0.), fish (Powell et al. Cultivation and differentiation of satellite cells from skeletal muscle of the rainbow trout Salmo gairdneri. J Exp Zool. 1989; 250(3):333-338), lambs (Dodson et al. Isolation of satellite cells from ovine skeletal muscles. J Tissue Cult Methods. 1986; 10(4):233-237. doi: 10.1007/BF01404483), pigs (Blanton Blanton et al. Isolation of two populations of myoblasts from porcine skeletal muscle. Muscle Nerve. 1999; 22(1):43-50. doi: 10.1002/(SICI)1097-4598(199901) 22:1, Wilschut et al. Isolation and characterization of porcine adult muscle-derived progenitor cells. J Cell Biochem. 2008; 105(5):1228-1239.), and turkeys (McFarland et al. Proliferation of the turkey myogenic satellite cell in a serum-free medium. Comp Biochem Physiol. 1991; 99(1-2):163-167. doi: 10.1016/0300-9629(91)90252-8). Porcine muscle progenitor cells have the potential for multilineage differentiation into adipogenic, osteogenic and chondrogenic lineages, which may play a role in the development of co-cultures (Wilschut et al. 2008, supra). Advanced technology in tissue engineering and cell biology offer some alternate cell options having practical applications and multilineage potential allowing for co-culture development with suitability for large-scale operations.

Alternatively, as mentioned, adult stem cells from farm animal species can be used. For instance, myosatellite cells are an adult stem-cell type with multilineage potential (Asakura et al. Differentiation. 2001; 68(4-5):245-253. doi: 10.1046/j.1432-0436.2001.680412). These cells also have the capacity to differentiate into skeletal muscle cells. A rare population of multipotent cells found in adipose tissue known as adipose tissue-derived adult stem cells (ADSCs) is another relevant cell type for in vitro meat production (Gimble et al. Adipose-derived stem cells for regenerative medicine. Circ Res. 2007; 100(9):1249-1260. doi: 10.1161/01.RES.0000265074.83288.09) which can be obtained from subcutaneous fat and subsequently transdifferentiated to myogenic, osteogenic, chondrogenic or adipogenic cell lineages (Kim et al. Muscle regeneration by adipose tissue-derived adult stem cells attached to injectable PLGA spheres. Biochem Biophys Res Commun. 2006; 348(2):386-392. doi: 10.1016/j.bbrc.2006.07.063).

Matsumoto et al. (J Cell Physiol. 2007; 215(1):210-222.) reported that mature adipocytes can be dedifferentiated in vitro into a multipotent preadipocyte cell line known as dedifferentiated fat (DFAT) cells, reversion of a terminally differentiated cell into a multipotent cell type. These DFAT cells are capable of being transdifferentiated into skeletal myocytes (Kazama et al. Mature adipocyte-derived dedifferentiated fat cells can transdifferentiate into skeletalmyocytes in vitro. Biochem Biophys Res Commun. 2008; 377 (3):780-785. doi: 10.1016/j.bbrc.2008.10.046) and are an attractive alternative to the use of stem cells.

For the sake of completeness some representative protocols for differentiation of specific cell types are provided herein.

Chicken Adipocytes Differentiation from ES
Isolation and Cultivation of Chicken ES Cells Isolation and cultivation of chicken ES cells can be carried out following previously described method (Wu et al., 2008 Wu X S, He X H, Dai M J, Tian Z Q, Yang H Y, Xu Q, Li B C (2008). Isolation and Cultivation of Chicken Embryonic Stem Cells and Production of Single-cell Clone. China Poult., 30: 30-34). In brief, blastoderm cells at stage X are collected by spoon method in tissue culture dishes and rinsed with $Ca^{2+}$ and $Mg^{2+}$ free PBS to remove the yolks and vitelline membrane. After washing with PBS, ES cells are transferred into fresh tissue culture dishes containing PBS plus 0.25% trypsin and 0.04% EDTA. Followed by digestion at 37 0° C. for 5 to 8 min, the dissociated cells are collected by centrifugation at 1000 r/min for 8 to 10 min and suspended, then about $3-5\times10^4$ ES cells are maintained in a 5% $CO_2$ humidified atmosphere at 37 0° C. with DMEM and chicken embryonic fibroblast (CEF) cell monolayer. The medium is replaced daily with fresh medium. The cell colonies with undifferentiated morphology are rinsed three times with PBS and digested at 37 0° C. for 2 to 3 min with 0.25% trypsin plus 0.04% EDTA. The dissociated ES clusters are suspended with a pipette and sub-cultured in a 5% $CO_2$ humidified atmosphere at 37 0° C. with gelatin-coated flasks containing a feeder cell layer and DMEM medium. The medium is replaced daily with half fresh medium.

Induction of Chicken ES Cells into Adipocytes

Chicken ES cells of the third passage are sub-cultured in DMEM medium with 10% FBS for 48 h. The cells are induced firstly in an adipocyte induction medium with 10% FBS, $5.5\times10^{-5}$ mol/l β-ME (Sigma-Aldrich, Inc., St. Louis, MO, USA), $1\times10^{-6}$ mol/L DEX (Maixin), 10 mg/ml Ins (Maixin), and $5\times10^{-4}$ mol/l IBMX (Sigma) for 3 days and then in DMEM medium supplemented with 10% FBS, $5.5\times10^5$ mol/L β-ME, 10 mg/ml Ins. After cultivation for an additional day, the medium is changed by induction solutions DMEM with GlutaMAX (Gibco, 31966-021) supplemented with 10% of Hyclone FBS (Thermo, SH30070.03), 100× Non-Essential Amino Acid solution (Sigma, M7145), 100× Penicillin/Streptomycin (PAA, P11-010). Thereafter, the earlier step IS repeated three times. 21 days post-induction, the derived adipocytes are identified by oil red O staining as previously described (Yu F, Ge J H, Ni L G, He X H, Xu Q, Li B C (2008). In vitro Induction of Differentiation of Chicken Spermatogonial Stem Cells into Adipocytes. J. Agric. Biotechnol. 16: 450-455).

Protocols for differentiation of chicken ES cells can be found in Li B, Zhang Y, Chen X, Shi Q, Fu D, Yin Y, et al. Directional differentiation of chicken embryonic stem cells into osteoblasts, neuron-like cells and adipocytes. African J. Biotechnol. 2011; 10: 7772-7779.

Erythroblasts Differentiation from ES (Via Embryoid Bodies)

Embryonic body (EB) (Li B, Zhang Y, Chen X, Shi Q, Fu D, Yin Y, et al. Directional differentiation of chicken embryonic stem cells into osteoblasts, neuron-like cells and adipocytes. African J. Biotechnol. 2011; 10: 7772-7779) cell expansion:

$10^6$ cESC cells are thawed in gelatinized plates in cESC proliferation medium containing DMEM with 2 mM L-glutamine, 100 U/mL penicillin, and 100 g/mL streptomycin [all from Gibco/BRL, Carlsbad, CA], 15% fetal calf serum [FCS; Euroclone, Milano, Italy], 1% leukemia inhibitory factor [LIF]-supernatant, $1.5\times10^{-4}$ M monothioglycerol [MTG; Sigma, St Louis, MO]) on gelatinized plates. The basic medium is changed from DMEM to Iscove modified Dulbecco medium (IMDM; Gibco/BRL) 2 days prior to in vitro differentiation. Cells are grown without feeder cells. The medium is changed daily using mESC medium. The basic medium was is from DMEM to IMDM 2 days prior to in vitro differentiation.

Embryonic Body (EB) Formation

20 μL drops of the $1\times10^{4c}$ cESC cells/mL suspension are placed onto the inner surface of 150 mm plate. They are incubated for 5 days and EBs are collected with 10 mL PBS into a 50 mL conical sterile tube. The EBs are allowed to sediment for 10-20 min at room temperature and PBS is removed. 0.05% trypsin is added to the cell culture and incubated for 2-7 min and Inactivated the trypsin by 2 mL differentiation medium. The EBs obtained from one plate are replated in 150 Place back in the incubator to 1-4 days.

Generation of ES Cell-Derived Erythroid Cultures (ES-EPs)

EB-derived cells at a concentration of $2\times10^6$/mL are seeded into serum-free medium (StemPro34 plus nutrient supplement; Gibco/BRL) plus human recombinant erythropoietin (Epo; 2 U/mL; Erypo; Janssen-Cilag A G, Baar, Switzerland), murine recombinant Kit-ligand (KL or stem cell factor [SCF]; 100 ng/mL; R&D Systems, Minneapolis, MN), $10^6$ M dexamethasone (Sigma), and 40 ng/mL insulin-like growth factor 1 (IGF-1; Promega, Madison, WI). At day 1 and day 3 of cultivation, the suspension of cells is collected and replated into a new dish.

Cell density is maintained between 2 and $4 \times 10^6$ cells/mL. ES-EPs are washed twice with PBS and cultivated at $2 \times 10^6$ cells/mL in serum-free medium (StemPro34 plus nutrient supplement) supplemented with 10 U/mL Epo, insulin (10 ng/mL; Actrapid HM; Novo Nordisk), $3 \times 10^6$ M of the glucocorticoid receptor antagonist ZK112.993,3 and one mg/mL iron-saturated human transferrin. ES-EPs derived from 6-day-old embryoid bodies are cultivated for 16 days under erythroid conditions, washed twice in PBS, and resuspended in IMDM.

Protocols for erythrocyte differentiation can be found in_Carotta, S.; Pilat, S.; Mairhofer, A.; Schmidt, U.; Dolznig, H.; Steinlein, P.; Beug, H. Directed differentiation and mass cultivation of pure erythroid progenitors from mouse embryonic stem cells. Blood 2004, 104, 1873-1880. Protocols for Hepatocyte Differentiation can be Found in Stock et al., *The generation of hepatocytes from mesenchymal stem cells and engraftment into murine liver*. Nature protocols, VOL. 5 NO. 4, 2010; Protocols for cardiomyocyte differentiation can be found in Breckwoldt et al., Differentiation of cardiomyocytes and generation of human engineered heart tissue Nature protocols, VOL. 12 NO. 6, 2017.

According to a specific embodiment, the cells are differentiated from mesenchymal stem cells, hematopoietic stem cells or embryonic stem cells.

As used herein "tissue" refers to a structure of more than one cell type that is aggregated (e.g., connected) by natural or synthetic means (e.g., matrix).

According to a specific embodiment, the foodstuff is devoid of animal contaminants such as animal pathogens (that occur in vivo), hazardous concentrations of hormone(s) (e.g., ketosteroids, GH) and antibiotics that typically cause rapid weight gain).

According to a specific embodiment, the cells are grown in a free pathogen, virus, bacteria and nitrate and are distributed in such conditions as well.

Ultroser G is an example of a commercially available serum substitute containing growth factors, binding proteins, adhesin factors, vitamins, hormones, mineral trace elements and has been designed specially to replace fetal bovine serum for growth of anchorage-dependent cells in vitro (Duque et al. Use of two replacements of serum during bovine embryo culture in vitro. Theriogenology. 2003; 59(3-4):889-899. doi: 10.1016/50093-691X(O2)01134-2). Benjaminson et al. (vitro edible muscle protein production system (MPPS): Stage 1, fish. Acta Astronaut. 2002; 51(12):879-889. doi: 10.1016/S0094-5765(02)00033-4) succeeded in using a serum-free medium made from maitake mushroom extract that achieved higher rates of growth than fetal bovine serum and recently it has been shown that lipids such as sphingosine-1-phosphate can replace serum in supporting the growth and differentiation of embryonic tissue explants.

According to a specific embodiment, the foodstuff is free of growth hormone (GH) in an amount hazardous for human or animal consumption (undetectable amounts by HPLC).

According to a specific embodiment, the plant-originated substance augments (by way of reaction) the organoleptic properties of the non-human cultured meat cells within the hybrid foodstuff.

The plant-originated substance is selected such that it supports the development of flavor components when reacting with the cultured biomass during the preparation of the hybrid food, such as cooking, baking, frying, grilling, roasting etc. Thus the hybrid foodstuff mimics the equivalent development of flavors in conventional meat preparations.

According to a specific embodiment, animal-derived protein in the hybrid foodstuff is below 50% (w/w).

According to a specific embodiment, animal-derived protein in the hybrid foodstuff is below 45% (w/w).

According to a specific embodiment, animal-derived protein in the hybrid foodstuff is below 40% (w/w).

According to a specific embodiment, animal-derived protein in the hybrid foodstuff is below 35% (w/w).

According to a specific embodiment, animal-derived protein in the hybrid foodstuff is below 30% (w/w).

According to a specific embodiment, animal-derived protein in the hybrid foodstuff is below 50% (w/w).

According to a specific embodiment, animal-derived protein in the hybrid foodstuff is below 25% (w/w).

According to a specific embodiment, animal-derived protein in the hybrid foodstuff is below 20% (w/w).

According to a specific embodiment, animal-derived protein in the hybrid foodstuff is below 15% (w/w).

According to a specific embodiment, the animal protein in the hybrid foodstuff is 10-49% (w/w).

According to a specific embodiment, the foodstuff is not a chip and and/or the plant-originated substance is not a plant derived hydrogel.

As mentioned, the foodstuff preparation is performed by combining a plant-originated substance with an amount of cultured meat cells.

The terms "connection between" and "interconnected with" as defined above refers to those specific cases where at least two different portions are provided inter alia, by any suitable means, including (i) where the at least one second portion is comprised, immersed, wetted, solubilized, suspended, doped, glued, attached, aggregated, mixed, contained or otherwise, directly or indirectly, provided in contact within and/or upon or on top of the aforesaid at least one first portion; and (ii), where the at least one second portion is chemically, biologically and/or physically reacts with the aforesaid at least one first portion so that either integral or non-integral non-cultured meat and cultured meat substantially unified phase, matter or composition is obtained.

The combined matter can be subjected to further processing such as by means of rising, kneading, extruding, molding, shaping, cooking, stewing, boiling, broiling, baking, frying and any combination of same.

The present invention discloses a novel hybrid foodstuff technology where the foodstuff comprises, inter alia, from about 82% to about 99% (w/w) plant-originated substances and additives thereof and about 18% to about 1% (w/w) cultured meat (cultured animal cells).

The present invention discloses a novel hybrid foodstuff technology where the foodstuff comprises, inter alia, at least about 82% plant-originated substances and additives thereof and 18% (w/w) or lower cultured meat (cultured animal cells).

The present invention discloses a novel hybrid foodstuff technology where the foodstuff comprises, inter alia, at least about 83% plant-originated substances and additives thereof and 17% (w/w) or lower cultured meat (cultured animal cells).

The present invention discloses a novel hybrid foodstuff technology where the foodstuff comprises, inter alia, at least about 84% plant-originated substances and additives thereof and 16% (w/w) or lower cultured meat (cultured animal cells).

The present invention discloses a novel hybrid foodstuff technology where the foodstuff comprises, inter alia, at least about 85% plant-originated substances and additives thereof and 15% (w/w) or lower cultured meat (cultured animal cells).

The present invention discloses a novel hybrid foodstuff technology where the foodstuff comprises, inter alia, at least about 86% plant-originated substances and additives thereof and 14% (w/w) or lower cultured meat (cultured animal cells).

The present invention discloses a novel hybrid foodstuff technology where the foodstuff comprises, inter alia, at least about 87% plant-originated substances and additives thereof and 13% (w/w) or lower cultured meat (cultured animal cells).

The present invention discloses a novel hybrid foodstuff technology where the foodstuff comprises, inter alia, at least about 88% plant-originated substances and additives thereof and 12% (w/w) or lower cultured meat (cultured animal cells).

The present invention discloses a novel hybrid foodstuff technology where the foodstuff comprises, inter alia, at least about 89% plant-originated substances and additives thereof and 11% (w/w) or lower cultured meat (cultured animal cells).

The present invention discloses a novel hybrid foodstuff technology where the foodstuff comprises, inter alia, at least about 90% plant-originated substances and additives thereof and 10% (w/w) or lower cultured meat (cultured animal cells).

The present invention discloses a novel hybrid foodstuff technology where the foodstuff comprises, inter alia, at least about 91% plant-originated substances and additives thereof and 9% (w/w) or lower cultured meat (cultured animal cells).

The present invention discloses a novel hybrid foodstuff technology where the foodstuff comprises, inter alia, at least about 92% plant-originated substances and additives thereof and 8% (w/w) or lower cultured meat (cultured animal cells).

The present invention discloses a novel hybrid foodstuff technology where the foodstuff comprises, inter alia, at least about 93% plant-originated substances and additives thereof and 7% (w/w) or lower cultured meat (cultured animal cells).

The present invention discloses a novel hybrid foodstuff technology where the foodstuff comprises, inter alia, at least about 94% plant-originated substances and additives thereof and 6% (w/w) or lower cultured meat (cultured animal cells).

The present invention discloses a novel hybrid foodstuff technology where the foodstuff comprises, inter alia, at least about 95% plant-originated substances and additives thereof and 5% (w/w) or lower cultured meat (cultured animal cells).

The present invention discloses a novel hybrid foodstuff technology where the foodstuff comprises, inter alia, at least about 96% plant-originated substances and additives thereof and 4% (w/w) or lower cultured meat (cultured animal cells).

The present invention discloses a novel hybrid foodstuff technology where the foodstuff comprises, inter alia, at least about 97% plant-originated substances and additives thereof and 3% (w/w) or lower cultured meat (cultured animal cells).

The present invention discloses a novel hybrid foodstuff technology where the foodstuff comprises, inter alia, at least about 98% plant-originated substances and additives thereof and 2% (w/w) or lower cultured meat (cultured animal cells).

The present invention discloses a novel hybrid foodstuff technology where the foodstuff comprises, inter alia, at least about 99% plant-originated substances and additives thereof and 1% (w/w) or lower cultured meat (cultured animal cells).

According to an aspect of the invention there is provided a hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is below 30% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is below 25% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is below 20% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is below 15% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is below 10% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is below 5% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is below 3% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is 3-30% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is 3-25% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is 3-20% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is 3-15% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is 3-10% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is 5-15% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is 10-15% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is 7.5-15% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is 3-5% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is 7.5-10% (w/w) of the hybrid foodstuff.

According to an embodiment, the hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is 3-12% (w/w) of the hybrid foodstuff.

The present invention also discloses a novel hybrid foodstuff technology wherein a portion of the cultured meat in the end product is defined as the minimal weight percent providing this end product with an enhancement in a meat organoleptic property or meat nutritional property than the corresponding foodstuff being non-hybrid, cultured meat free vegetable-based product.

An aspect of the invention also relates to a method of qualifying a hybrid foodstuff, the method comprising subjecting the hybrid foodstuff to at least one organoleptic test.

According to a specific embodiment, the hybrid foodstuff is any of the hybrid foodstuffs contemplated herein.

Methods of organoleptic assaying are well known in the art, some of which are described infra.

Organoleptic (sensory) evaluation is a common and very useful tool in quality assessment of processed food (e.g., meat) products, but to date not for hybrid foodstuffs. It makes use of the senses to evaluate the general acceptability and quality attributes of the products. The assays typically make use of dedicated panelists and/or artificial means.

All panelists must use proven and identical test methods in order to make their results comparable. Each panelist involved in such tests is given a scoresheet, where they mark their findings. Scoresheets of the team of panelists are evaluated and a test result for each individual product is produced based on multiple observations.

Common test methods used in sensory evaluation are:
1. Paired comparison test for simple difference where two coded samples are presented to the panelists for evaluation on simple difference (Table B).
2. Triangle test where three coded samples are presented at the same time, two are identical and the third is odd and the panelist is asked to identify the odd sample (Table C).
203. Hedonic scale rating test or acceptability test where samples are tested to determine their acceptability or preference (Table D).

TABLE B

Score sheet for Paired-Comparison Test for Simple Difference

Name: Product:
Panelist No.: Date:
Instructions:
You are given a pair of coded samples. Indicate if there is a difference between them by placing an x mark under the appropriate column. Please write down any comments.

| SAMPLE PAIR CODE | THERE IS A DIFFERENCE | THERE IS NO DIFFERENCE |
| --- | --- | --- |

Comments:

TABLE C

Score sheet for Triangle Test

Name: Product:
Panelist No.: Date:
Instructions:
You are presented with three coded samples of ___. Two of these samples are identical while the third is odd or different. Smell and taste each sample. Indicate the code of the odd sample by placing an x mark across the code. Please write down any comments.

| SAMPLE CODE | ODD SAMPLE |
| --- | --- |

Comments:

TABLE D

Score sheet for hedonic-scale rating test

Name:                                         Product:
Panelist No.:                           Date:
Instructions:
Taste the given samples, then place an x mark on the point
in the scale which best describes your feeling.

SCORE*                                  SAMPLE CODE (9) Like extremely
(8) Like very much
(7) Like moderately
(6) Like slightly
(5) Neither like nor dislike
(4) Dislike slightly
(3) Dislike moderately
(2) Dislike very much
(1) Dislike extremely

*Note:
Numbers in parentheses are to be assigned during data analysis and are not to appear in the score sheet.

Tests for simple difference and the triangle test are very useful methods for quality control and product development. Newly formulated products can be evaluated by determining if a simple difference exists between the new products developed and the old ones. Similarly, the hedonic scale rating can be used for internal factory testing, and this method is also suitable for market research by determining the consumer's acceptance or preference for certain products. Such a method i.e., the 9-PHS method is further described hereinbelow.

Instruments for Texture Measurement

Sensory testing (chewing) is normally sufficient to test tenderness/toughness or homogenous/fibrous structure of meat and meat products. If more objective results are desired, special instruments for texture measurement can be employed. Such a device typically measures the shear-force necessary to cut through meat/meat products. Comparative texture measurements are usually taken from same tissues or products which were submitted to different treatments such as ripening, cooking etc.

According to a specific embodiment, organoleptic assaying is effected by a combination of expert panel studies and by consumer difference and preference tests.

The expert panel studies may include two types of tests:

Difference testing—proving statistically the sensory benefits of the hybrid foodstuff as compared to the corresponding product without the cultured animal cells (substituted or not as defined);

Quantitative Descriptive Analysis (QDA)—demonstrating how the the hybrid foodstuff differs in specific sensory attributes from the corresponding product without the cultured animal cells (substituted or not as defined), with emphasis on the magnitude of meat related texture and flavor characteristics.

Consumer studies will demonstrated how well the products are liked, which are preferred, and will quantify the effect of the SuperMeat on preferred sensory attributes.

Sensory Attributes

The list of relevant sensory attributes includes three main groups, adjusted individually per type of product, as follows:

Appearance: surface color, internal color, texture (coarsness, uniformity), overall rating with relevance to the type of product tested.

Texture: hardness/softness, juiciness/dryness, cohesiveness, chewiness, fatty/oily mouthfeel, overall rating.

Taste and flavor (possible list of positive and negative characteristics of aroma and taste): meaty, cooked chicken, roasted chicken, bouillon-like (brothy), greasy, burned, sweet, bitter, rancid, overall rating.

The detailed sensory list applies to the expert panel studies, mainly the QDA comparisons.

Selected and easily understood attributes in each sensory category (appearance, texture and taste) are used for the consumer acceptance and preference studies.

The present invention also discloses a novel hybrid foodstuff technology wherein a portion of the cultured meat in the end product is defined as the minimal weight percent providing this end product with one point more in a 9-PHS (as will defined below) than the corresponding foodstuff being non-hybrid, cultured meat free vegetable-based product.

The present invention further discloses a novel hybrid foodstuff technology wherein this foodstuff comprises, inter alia, about 70% to about 99.7% (w/w) plant-originated substances and additives thereof (vegetable portion) and water immiscible materials (oil portion), ranging from about 3% to 30% (w/w), where the improvement is that said oil portion consists of about 30% (w/w) or less vegetable oil, and from about 0.3% to about 30% (w/w) cultured meat.

The present invention further discloses a novel hybrid foodstuff technology wherein this foodstuff comprises, inter alia, about 70% to about 99.7% (w/w) plant-originated substances and additives thereof (e.g., gum, binding, thickening, aroma flavor additives) and/or water immiscible materials (oil portion), ranging from about 3% to 30% (w/w), where the improvement is that said additives thereof (e.g., gum, binding, thickening, aroma flavor additives) and/or water immiscible materials (oil portion) consists of about 30% (w/w) or less vegetable oil, and from about 0.3% to about 30% (w/w) cultured meat.

Where the improvement is that it allows for the replacement of meat taste and aroma flavor additives which are mostly synthetic or based on different types of hydrolysates (of plant or yeast proteins) by incorporating a composition of cultured meat cells such as erythrocytes, hepatocytes and/or adipocytes, allowing for the development of hybrid foodstuff with minimal additives and flavorings ingredients providing authentic meat taste.

Where the improvement is that it allows for the replacement gums and binding or thickening additives in meat substitutes by incorporating a composition of cultured meat cells such as erythrocytes, hepatocytes and/or adipocytes, allowing for the development of hybrid foodstuff with minimal additives ingredients providing authentic meat texture.

Thus, the present teachings contemplate for substitution of various components which are non meat in the foodstuff so as to render them more nutritional and/or with improved organoleptic properties.

The present invention additionally discloses a novel hybrid foodstuff technology wherein this foodstuff comprises, inter alia, about 70% to about 99.7% (w/w) plant-originated substances and additives thereof (vegetable portion) and water immiscible materials (oil portion), ranging from about 3% to 30% (w/w), where the improvement is that said oil portion consists of about 30% (w/w) or less vegetable oil, and from about 0.3% to about 30% (w/w) cultured meat; wherein the smallest portion of the cultured meat in the end product is defined as the minimal weight percent providing said end product with at least one 9-PHS point more than a corresponding foodstuff being non-hybrid, cultured meat free vegetable-based product.

The control is defined as the same plant-originated foodstuff that is devoid of the supplementation or addition of the cultured meat cells.

The present invention further discloses a novel hybrid foodstuff technology wherein this foodstuff comprises, inter alia, about 70% to about 99.7% (w/w) plant-originated substances and additives thereof (e.g., gum, binding, thickening, aroma flavor additives) and/or water immiscible materials (oil portion), ranging from about 3% to 30% (w/w), where the improvement is that said additives thereof (e.g., gum, binding, thickening, aroma flavor additives) and/or water immiscible materials (oil portion) consists of about 30% (w/w) or less vegetable oil, and from about 0.3% to about 30% (w/w) cultured meat, wherein the smallest portion of the cultured meat in the end product is defined as the minimal weight percent providing said end product with at least one 9-PHS point more than a corresponding foodstuff being non-hybrid, cultured meat free vegetable-based product.

It is hence on the scope of the invention wherein a cultured meat containing hybrid foodstuff as defined above comprises: $X_T$ % by weight of non-cultured meat foodstuff portion, e.g., plant-originated substances, such as roots, leaves, stems, flowers and fruits of plants, where solids of soy protein hydrolysate is an example; $X_i$ % by weight of an $i^{th}$ at least one ingredient of said non-cultured meat foodstuff portion, canola oil is an example; and Y % by weight of cultured meat cells.

Moreover, the present invention hence discloses a novel hybrid foodstuff technology wherein this foodstuff is characterized by about 70% to about 99.7% (w/w) plant-originated substances and additives thereof (vegetable portion) and water immiscible materials (oil portion), ranging from about 3% to 30% (w/w); said oil portion consists of up to about 30% (w/w) or less vegetable oil, and from about 0.3% to about 30% (w/w) cultured meat; wherein the role said mixtures in the oil portion (measured as vegetable oil to culture meat (w/w) in improving the organoleptic properties (measured as 9-PHS) of said hybrid foodstuff of is provided by any of Formula I, II or III as defined below.

The Role of Vegetable Fat Substitution by Cultured Hepatocytes in Hybrid Foodstuffs According to an embodiment of the invention, $X_T$, $X_i$ & Y values, here % are defined are weight to total dry weight ratio, are provided in Table 1 below. It is acknowledged that in this patent the term 'about' refers to any value being up to 20% (e.g., 10%) bigger or 20% smaller (e.g., 10%) than the defined measure.

TABLE 1

| | Possible $X_T$, $X_i$ & Y values | | |
|---|---|---|---|
| | $X_T$, % (wt/dry wt) | $X_i$, % (wt/dry wt) | Y, % (wt/dry wt) |
| 1$^{st}$ hybrid foodstuff | from about 51% to about 75% | from about 1% to about 5% | from about 49% to about 25% |
| 2$^{nd}$ hybrid foodstuff | from about 51% to about 75% | from about 6% to about 10% | from about 49% to about 25% |
| 3$^{rd}$ hybrid foodstuff | from about 51% to about 75% | from about 11% to about 15% | from about 49% to about 25% |
| 4$^{th}$ hybrid foodstuff | from about 51% to about 75% | from about 16% to about 20% | from about 49% to about 25% |
| 5$^{th}$ hybrid foodstuff | from about 51% to about 75% | from about 21% to about 25% | from about 49% to about 25% |

TABLE 1-continued

| | Possible $X_T$, $X_i$ & Y values | | |
|---|---|---|---|
| | $X_T$, % (wt/dry wt) | $X_i$, % (wt/dry wt) | Y, % (wt/dry wt) |
| 6$^{th}$ hybrid foodstuff | from about 51% to about 75% | from about 26% to about 30% | from about 49% to about 25% |
| 7$^{th}$ hybrid foodstuff | from about 76% to about 90% | from about 1% to about 5% | from about 24% to about 10% |
| 8$^{th}$ hybrid foodstuff | from about 76% to about 90% | from about 6% to about 10% | from about 24% to about 10% |
| 9$^{th}$ hybrid foodstuff | from about 76% to about 90% | from about 11% to about 15% | from about 24% to about 10% |
| 10$^{th}$ hybrid foodstuff | from about 76% to about 90% | from about 16% to about 20% | from about 24% to about 10% |
| 11$^{th}$ hybrid foodstuff | from about 76% to about 90% | from about 21% to about 25% | from about 24% to about 10% |
| 12$^{th}$ hybrid foodstuff | from about 76% to about 90% | from about 26% to about 30% | from about 24% to about 10% |
| 13$^{th}$ hybrid foodstuff | from about 91% to about 95% | from about 1% to about 7% | from about 9% to about 5% |
| 14$^{th}$ hybrid foodstuff | from about 91% to about 95% | from about 8% to about 14% | from about 9% to about 5% |
| 15$^{th}$ hybrid foodstuff | from about 91% to about 95% | from about 15% to about 21% | from about 9% to about 5% |
| 16$^{st}$ hybrid foodstuff | from about 91% to about 95% | from about 22% to about 29% | from about 9% to about 5% |
| 17$^{nd}$ hybrid foodstuff | from about 91% to about 95% | from about 30% to about 37% | from about 9% to about 5% |
| 18$^{th}$ hybrid foodstuff | from about 91% to about 95% | from about 38% to about 45% | from about 9% to about 5% |

In one embodiment of the invention, hepatocytes, i.e., cells of the main parenchymal tissue of the liver mass, are harvested and provided as a substituted canola oil various fractions in both sausage-like, ground beef-like and schnitzel-like novel hybrid foods.

The term 'hepatocytes cells' used hereinafter concurrently refers to (a) hepatocytes cells; (b) genetically engineered liver tissue ingredients;

A hedonic rating scale is utilizable to measure food acceptance, see Lim, Juyun. "Hedonic scaling: A review of methods and theory."*Food quality and preference* 22.8 (2011): 733-747, which is incorporated herein as a reference. A 9-point hedonic scale, utilizable herein, is a balanced bipolar scale around neutral at the center with four positive and four negative categories on each side. The categories are labeled with phrases representing various degrees of affect and those labels are arranged successively to suggest a single continuum of likes and dislikes, as follows:

| 9-Point Hedonic Scale | |
|---|---|
| 9 | Like Extremely |
| 8 | Like Very Much |
| 7 | Like Moderately |
| 6 | Like Slightly |
| 5 | Neither Like nor Dislike |
| 4 | Dislike Slightly |
| 3 | Dislike Moderately |
| 2 | Dislike Very Much |
| 1 | Dislike Extremely |

Table 2 below describes potential results for assessment of chicken sausage-like, ground beef-like and calf schnitzel-like cultured meet-containing hybrid foods, as can be measured by 9-point hedonic scale (9-PHS).

Can be tested on individuals of the following characterization N=25, age 30-65 yrs, about 50% male,

TABLE 2

| | $X_T$, % (wt/dry wt) Soy protein hydrolysate-based solids | $X_j$, % (wt/dry wt) Canola oil | Y, % (wt/dry wt) Cultured hepatocytes | 9-PHS |
|---|---|---|---|---|
| sausage-like dish | 100% | 30% | 0% | 5 |
| sausage-like dish | 95% | 25% | 5% | 6 |
| sausage-like dish | 87% | 17% | 13% | 7 |
| sausage-like dish | 80% | 10% | 20% | 7 |
| sausage-like dish | 73% | 3% | 27% | 7 |
| ground beef-like dish | 100% | 30% | 0% | 4 |
| ground beef-like dish | 95% | 25% | 5% | 5 |
| ground beef-like dish | 87% | 17% | 13% | 6 |
| ground beef-like dish | 80% | 10% | 20% | 7 |
| ground beef-like dish | 73% | 3% | 27% | 8 |
| schnitzel-like dish | 100% | 30% | 0% | 4 |
| schnitzel-like dish | 95% | 25% | 5% | 6 |
| schnitzel-like dish | 87% | 17% | 13% | 8 8 |
| schnitzel-like dish | 80% | 10% | 20% | |
| schnitzel-like dish | 73% | 3% | 27% | 6 |

The function of such a replacement is provided useful [$R^2$ = 0.92] by formula I:
Formula I
9-points hedonic score = $a + bX^c$
Where: a is ranging from about −2 to about 2; e.g., $2*10^{-3}$;
b is ranging from about −3 to about 3; e.g., 1;
c is ranging from about −1 to about 5; e.g., 3.4.
The function of such a replacement is provided useful [$R^2$ = 0.98] by formula II:
Formula II
9-points hedonic score = $a + bX + cX^2$
Where: a is ranging from about 0 to about 4; e.g., 3.4
b is ranging from about 1 to about 3; e.g., 1.8; and
c is ranging from about −1 to about 2.5; e.g., 0.2
The function of such a replacement is provided useful [$R^2$ = 0.98] by formula III:
Formula III
9-points hedonic score = $a + bX + cX^2$
Where: a is ranging from about 0 to about 4; e.g., −0.4
b is ranging from about 2 to about 6; e.g., 4.8; and
c is ranging from about −1 to about 2.5; e.g., −0.7.

The Role of Cultured Heme-Proteins in Hybrid Foodstuffs

The two main heme proteins (HPs), hemoglobin and myoglobin, are important factors determining meat quality aspects such as color and hemorrhage, see Kranen, R. W., et al. "Hemnoglobin and myoglobin content in muscles of broiler chickens."*Poultry science* 78.3 (1999): 467-476; and see Boles. Jane Ann, and Ronald Pegg. "Meat color." Montana State University and Saskatchewan Food Product Innovation, Program University of Saskatchewan (2010), which are both incorporated herein as a reference.

It is well in the scope of the invention where HPs are cultured in various methods, various sources, including, e.g., liver, hone marrow, mesenchymal cells or any other multipotent stromal cells that can differentiate into a variety of cell types, including osteoblasts (bone cells), chondrocytes (cartilage cells), myocytes (muscle cells) and adipocytes (fat cells); yet for convenient and in a non-limiting manner, one set of examples will be hereto disclosed.

Hepatocytes are enriched by those two main HPs and thus provide meat-like foods with improved organoleptic properties including meat-like color, texture, mouth feel, odor, flavor and appearance. Heme derived from the hepatocytes increasing bioavailability of the iron at about 24% higher than that in food containing iron sulfate, see G. Gonzalez-Rosendo, et al., "Bioavailability of a heme-iron concentrate product added to chocolate biscuit filling in adolescent girls living in a rural area of Mexico," *Journal of Food Science*, vol. 75, pp. H73-H78, 2010 which is incorporated herein as a reference.

In another embodiment of the present invention, six different novel hybrid foodstuffs are disclosed: (a) A chicken-flavored cultured-meat containing foodstuff, namely sausage-like hybrid food (I) and ground meat-like hybrid food (II), where the differentiated hepatocytes cells are cultivated to provide about 0.03% to about 0.07% HPs in the foodstuff; (a) A chicken-flavored cultured-meat containing foodstuff, where the differentiated hepatocytes cells are cultivated to provide about 0.1% to about 0.7% HPs; (b), A beef-flavored cultured-meat containing foodstuff, where the differentiated hepatocytes cells are cultivated to provide about 0.75 to about 2.5% HPs; (c) A chicken-flavored cultured-meat containing foodstuff, where the differentiated hepatocytes cells are cultivated to provide about 0.1% to about 0.3% oxymyoglobin; (d) A chicken-flavored cultured-meat containing foodstuff, where the differentiated hepatocytes cells are cultivated to provide about 0.1% to about 0.3% myoglobin; (e) A chicken-flavored cultured-meat containing foodstuff, where the differentiated hepatocytes cells are cultivated to provide about 0.1% to about 0.3% metmyoglobin; and (f) a combination (2.5% in total) of the same.

As mentioned, cultured cells can be used in their native form in the hybrid foodstuff or treated or genetically engineered to enrich a certain trait/phenotype e.g., level of expression of HPs.

Methods of genetically modifying cells are well known in the art.

Table 3 below describes potential results for assessment of sausage-like hybrid food (I) and ground meat-like hybrid food (11) cultured meet-containing hybrid foods as can be measured by 9-point hedonic scale (9-PHS).

The assay can be executed on individuals of the following characterization N=25, age 30-65 yrs, about 50% male,

TABLE 3

| | Heme-containing myoglobin, % (wt/dry wt) | Heme-containing oxymyoglobin, % (wt/dry wt) | Heme-containing metmyoglobin, % (wt/dry wt) | 9-PHS |
|---|---|---|---|---|
| sausage-like dish | 0.01 | | | 4 |
| sausage-like dish | 0.20 | | | 4 |
| sausage-like dish | 0.50 | | | 5 |
| sausage-like dish | | 0.01 | | 6 |
| sausage-like dish | | 0.20 | | 6 |
| sausage-like dish | | 0.50 | | 7 |
| sausage-like dish | | | 0.01 | 5 |

TABLE 3-continued

| | Heme-containing myoglobin, % (wt/dry wt) | Heme-containing oxymyoglobin, % (wt/dry wt) | Heme-containing metmyoglobin, % (wt/dry wt) | 9-PHS |
|---|---|---|---|---|
| sausage-like dish | | | 0.20 | 5 |
| sausage-like dish | | | 0.50 | 6 |
| sausage-like dish | 0.01 | 0. | 0.04 | 6 |
| sausage-like dish | 0.01 | 1.5 | 0.14 | 6 |
| sausage-like dish | 0.05 | 1.9 | 0.04 | 4 |
| sausage-like dish | 0.15 | 0.6 | 0.04 | 4 |
| sausage-like dish | 0.20 | 0.1 | 0.04 | 5 |
| ground meat - like dish | 0.01 | | | 6 |
| ground meat - like dish | 0.20 | | | 6 |
| ground meat - like dish | 0.50 | | | 7 |
| ground meat - like dish | | 0.01 | | 5 |
| ground meat - like dish | | 0.20 | | 5 |
| ground meat - like dish | | 0.50 | | 6 |
| ground meat - like dish | | | 0.01 | 6 |
| ground meat - like dish | | | 0.20 | 6 |
| ground meat - like dish | | | 0.50 | 4 |

Table 3 above hence demonstrates the potential of in vitro produced HPs in cultured meat containing hybrid food and the synergic role of mixtures thereof in some of the foods, where improving food organoleptic features is to be shown.

The hybrid food is characterized by relatively high nutritional value. It provides with useful in administrating an effective dose of nutritional supplement, vitamins, minerals and proteins, e.g., those which inter alia selected from the group consisting of vitamins E, thiamine (B-1), riboflavin (B-2), niacin (B3-3), pantothenic acid (B3-5), B-6, biotin (1B-7), folic Acid B-9, B-12, A, C, D, K, magnesium, iron, zinc, omega-3 fatty acids, creatine, carnosine and mixtures of the same.

The hybrid cultured meat and products thereof are enriched to some degree, when required, with additives to protect or modify its flavor or color, to improve its tenderness, juiciness or cohesiveness, or to aid with its preservation. Cultured meat additives hence potentially include, inter alia, salt and other means to impart flavor and inhibits microbial growth, extends the product's shelf life and helps emulsifying finely processed products, such as sausages. Nitrite is utilizable in curing meat to stabilize the meat's color and flavor, and inhibits the growth of spore-forming microorganisms such as *C. botulinum*. Phosphates used in meat processing are normally alkaline polyphosphates such as sodium tripolyphosphate. Erythorbate or its equivalent ascorbic acid (vitamin C) is utilizable to stabilize the color of cured meat. Sweeteners such as sugar or corn syrup impart a sweet flavor, bind water and assist surface browning during cooking in the Maillard reaction. Seasonings impart or modify flavor. They include spices or oleoresins extracted from them, herbs, vegetables and essential oils. Flavorings such as monosodium glutamate impart or strengthen a particular flavor. Tenderizers break down collagens to make the meat more palatable for consumption. They include proteolytic enzymes, acids, salt and phosphate. Dedicated antimicrobials include lactic, citric and acetic acid, sodium diacetate, acidified sodium chloride or calcium sulfate, cetylpyridinium chloride, activated lactoferrin, sodium or potassium lactate, or bacteriocins such as nisin. Antioxidants include a wide range of chemicals that limit lipid oxidation, which creates an undesirable "off flavor", in precooked meat products. Acidifiers, most often lactic or citric acid, can impart a tangy or tart flavor note, extend shelf-life, tenderize fresh meat or help with protein denaturation and moisture release in dried meat. They substitute for the process of natural fermentation that acidifies some meat products such as hard salami or prosciutto.

It is thus within the scope of the invention wherein the hybrid food additionally comprising Acidity regulators, Acidity regulators, Anticaking agents, Anticaking agents, Antifoaming agents, Antifoaming agents, natural and other Antioxidants, Bulking agents, Food coloring agents, color retention agents, Emulsifiers, Flavors, Flavor enhancers, Flour treatment agents, Glazing agents, Humectants, Tracer gas, Preservatives, Probiotic microorganisms, Stabilizers, Sweeteners, Thickeners and any mixtures thereof.

In other embodiment of the present invention, the hybrid food product is a consumable, edible item having the final organoleptic properties of a meat product, and especially product(s) selected from the group consisting of Beef, Beef heart, Beef liver, Beef tongue, Bone soup from allowable meats, Buffalo, Bison, Calf liver, Caribou, Goat, Ham, Horse, Kangaroo, Lamb, Marrow soup, Moose, Mutton, Opossum, Organ Meats, Pork, Bacon, Rabbit, Snake, Squirrel, Sweetbreads, Tripe, Turtle, Veal, Venison, Chicken, Chicken Liver, Cornish Game Hen, Duck, Duck Liver, Emu, Gizzards, Goose, Goose Liver, Grouse, Guinea Hen, Liver, Ostrich, Partridge, Pheasant, Quail, Squab, and Turkey.

In other embodiment of the present invention, the hybrid food comprises ex vivo produced cells (cultured animal cells) selected in a non-limiting manner from a group consisting of myoblasts, osteoblasts, fibroblasts, lipoblasts, odontoblasts, adult neuronal progenitor cells, neural stem cells, multipotent stem cells from subventricular forebrain region, ependymal-derived neural stem cells, hematopoietic stem cells, liver-derived hematopoietic stem, marrow-derived stem cell, adipo-fibroblasts, adipose-derived stem cells, islet-cells producing stem cells, pancreatic-derived pluripotent islet-producing stem cells, mesenchymal stem cells, bone marrow stromal cells, muscle side population cells, bone marrow-derived recycling cells, blood-derived mesenchymal precursor cells, bone-marrow derived side population cells, muscle precursor cells, circulating skeleton stem cells, neural progenitor cells, multipotent adult progenitor cells, mesodermal progenitor cells, spinal cord progenitor cells and spore-like cell, mixtures or any combinations thereof.

Surfactant Filtration

In one embodiment of the present invention, the media of the cells is recovered and filtrated in order to extract compounds secreted from the cells. Said compounds are then used in the mix of the foodstuff.

Use of Scaffolds

In general, the cell lines are grown preferably without the use of scaffolds. It is also acknowledged that for those specific cell lines that scaffold is required for differentiation purposes, said scaffold will be used. Also, said scaffold will be an edible scaffold. Alternatively, the cells can be removed from the scaffold prior to inclusion in the hybrid food.

The present invention further provides a method of producing a hybrid food product, comprising steps of: a. providing plant-originated substance; b. providing cultured meat, cells and substances thereof; c. interconnecting said plant-originated substance with said cultured meat, cells and substances thereof; d. forming said hybrid food product into a desired form.

More specific, the present invention further provides a method of producing a hybrid food product, comprising steps of: a. providing plant-originated substance in a quantity following Table 1; b. providing cultured meat, cells and substances thereof in a quantity following Table 1; c. interconnecting said plant-originated substance with said cultured meat, cells and substances thereof; d. forming said hybrid food product into a desired form.

It is included in any of the methods, known in the art steps of cooking, sterilizing, pasteurizing, packaging and storing the hybrid food product.

Also provided is a method of providing nutrition to a subject in need thereof. The method comprising providing the subject with a hybrid foodstuff comprising a plant-originated substance and an amount of cultured animal cells so as to enhance a meat organoleptic and/or meat nutritional property in the hybrid foodstuff, wherein said animal cells do not form a tissue, and wherein said amount is below 50% (w/w) of the hybrid foodstuff (e.g., as described hereinabove).

According to a specific embodiment, the subject is at risk of nutritional deficiency.

According to a specific embodiment, the subject is a healthy subject (e.g., not suffering from a disease associated with nutrition/absorption).

According to a specific embodiment, the subject suffers from malnutrition.

According to a specific embodiment, the subject suffers from a disease associated with nutrition/absorption e.g., hypocobalaminemia, iron deficiency anemia, zinc deficiency and vitamin D deficiency, fatty acid deficiency.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

Meat-Flavored Hybrid Foodstuff Free of Harmful Substances at Harmful Quantities

[1] Meat is generally regarded by nutritionists as a healthy component of a well-balanced diet if eaten in moderation, although it's clearly not essential, as vegetarians have proven for eons; see Johnathon Andrew "*Benefits & Disadvantages of a Meat Diet*" in the currently available link //livehealthy(dot)chron(dot)com/benefits-disadvantages-meat-diet-1908(dot)html(dot).
Meat is an excellent source of protein and contains many of the vitamins and minerals that people need. On the other hand, meat is relatively high in fat and cholesterol, which are linked to increased risk of cardiovascular disease.

[2] Meat Diet: Meat is typically defined as the flesh, muscle tissue and organs from animals, particularly mammals such as cows, pigs and lamb. Birds such as chickens and turkeys are often classified generically as meat, but sometimes differentiated as poultry. Fish has its own category and is not usually referred to as meat. According to the Harvard School of Public Health, meats should be placed at the very top of any food pyramid, which signifies they should be eaten sparingly and in small portions. In comparison, poultry and fish are usually placed further down on food pyramids, reflecting higher consumption recommendations and greater health value.

[3] Main Benefits: Meat is an excellent source of protein in terms of both quantity and quality. For example, a typical 3-ounce portion of meat contains about 21 grams of protein, which is almost half the recommended dietary allowance for women each day. Meat is also a complete protein source because it contains all the essential amino acids your body cannot make. Amino acids are important building blocks for most tissues, such as muscle and skin, as well as enzymes. Meat is also a very good source of certain vitamins and minerals, especially most B vitamins, iron, zinc and phosphorus. Additionally, the density and caloric value of meat usually satisfies hunger better compared to equivalent amounts of vegetable foods.

[4] Main Disadvantages: The main disadvantages of eating meat are pertaining with ethical considerations, including moral (e.g., killing animals), cultural and religious (Kosher and Halal issues, for example) highly important issues. Other disadvantages are related to the fat, cholesterol and sodium content. People need some dietary fat and cholesterol on a regular basis for energy and to make cellular membranes and certain hormones. However, meat is relatively high in saturated fat and cholesterol, which increase the risk of cardiovascular diseases such as heart attack and atherosclerosis. Sodium is also a serious concern because too much leads to high blood pressure and increased risk of stroke and heart failure. On average, processed meat contains approximately 310 milligrams of sodium per ounce, whereas unprocessed meat has about 77 milligrams. Younger adults should aim for less than 2,300 milligrams of sodium daily, whereas elderly adults and those with risk factors for hypertension should consume less than 1,500 milligrams per day.

[5] Modest to aggressive changes in diet can improve health and reduce annual national medical expenditures by $60 billion to $120 billion, see Doll, Timothy M., et al. "Potential health benefits and medical cost savings from calorie, sodium, and saturated fat reductions in the American diet." *American Journal of Health Promotion* 23.6 (2009): 412-422 and to Karppanen, Heikki, and Eero Mervaala. "Sodium intake and hypertension."*Progress in cardiovascular diseases* 49.2 (2006): 59-75 both are incorporated herein as a reference. They have estimate that permanent 100-kcal reductions in daily intake would eliminate approximately 71.2 million cases of overweight/obesity and save $58 billion annually. Long-term sodium intake reductions of 400 mg/d in those with uncontrolled hypertension would eliminate about 1.5 million cases, saving $2.3 billion annually. Decreasing 5 g/d of saturated fat intake in those with elevated cholesterol would eliminate 3.9 million cases, saving $2.0 billion annually. Likewise, according to Kalmijn, Sandra, et al. "Dietary fat intake and the risk of incident dementia in the Rotterdam Study."*Annals of neurology* 42.5 (1997): 776-782 which is incorporated herein as a reference, high intakes of the following nutrients were associated with an increased risk of dementia: total fat (RR=2.4% intake as percentage of total energy intake), saturated fat (RR=1.9%) and cholesterol (RR=1.7%).

[6] Hybrid foods of the present invention comprises significantly less quantities of harmful substances, such as cholesterol, fat and saturated fat, as shown in Table 4 below.

[7] Hence, the present invention discloses a beef-flavored hybrid foodstuff free of harmful substances at harmful quantities; wherein said harmful substances including cholesterol, total fat and saturated fat; wherein harmful quantities are <60 mg, <8 gr and <3.5 gr per 100 gr, respectfully; and wherein said beef-flavored hybrid foodstuff comprises from about 82% to about 99% (w/w) plant-originated substances and additives thereof and about 1% to about 18% (w/w) cultured meat.

[8] The present invention also discloses a pork-flavored hybrid foodstuff free of harmful substances at harmful quantities; wherein said harmful substances including cholesterol, total fat and saturated fat; wherein harmful quantities are <60 mg, <5 gr and <1 gr per 100 gr, respectfully; and wherein said pork-flavored hybrid foodstuff comprises from about 82% to about 99% (w/w) plant-originated substances and additives thereof and about 1% to about 18% (w/w) cultured meat.

[9] The present invention further discloses a chicken-flavored hybrid foodstuff free of harmful substances at harmful quantities; wherein said harmful substances including cholesterol, total fat and saturated fat; wherein harmful quantities are <60 mg, <4 gr and <0.5 gr per 100 gr, respectfully; and wherein said chicken-flavored hybrid foodstuff comprises from about 82% to about 99% (w/w) plant-originated substances and additives thereof and about 1% to about 18% (w/w) cultured meat.

[10] The present invention further discloses a duck-flavored hybrid foodstuff free of harmful substances at harmful quantities; wherein said harmful substances including cholesterol, total fat and saturated fat; wherein harmful quantities are <60 mg, <4 gr and <0.5 gr per 100 gr, respectfully; and wherein said chicken-flavored hybrid foodstuff comprises from about 82% to about 99% (w/w) plant-originated substances and additives thereof and about 1% to about 18% (w/w) cultured meat.

TABLE 4

Cholesterol, fat and saturated fat content in 100 gr of hybrid foods of the current invention, as compared with 100 gr non-cultured (commercially available) foods, adapted from UCSF Medical Center web site, currently available at www(dot)ucsfhealth(dot)org/education/(dot)

| Meats & Protein | Cholesterol (mg) | Total Fat (g) | Saturated Fat (g) |
|---|---|---|---|
| Beef (ground, lean) | 78 | 18 | 7 |
| Beef (short ribs) | 94 | 42 | 18 |
| Beef (sirloin) | 89 | 12 | 5 |
| Beef Liver | 389 | 5 | 2 |
| Veal (top round) | 135 | 5 | 2 |
| Lamb (foreshank) | 106 | 14 | 6 |
| Ham | 53 | 6 | 2 |
| Pork (tenderloin) | 79 | 6 | 2 |
| Pork (chop) | 85 | 25 | 10 |
| Chicken Liver | 631 | 6 | 2 |
| Chicken (no skin) | 85 | 5 | 1 |
| Beef-like hybrid food | <60 | <8 | <3.5 |
| Pork-like hybrid food | <60 | <5 | <1 |
| Chicken-like hybrid food | <60 | <4 | <0.5 |

It is thus in the scope of the invention wherein a meat-flavored hybrid foodstuff based diet is provided useful for having nutritional value of meat, yet is free of harmful substances at harmful quantities; wherein said harmful substances including saturated fat, cholesterol and sodium wherein harmful quantities are 5 g/d, <200 mg and 400 mg/d, respectfully; and wherein said hybrid foodstuff comprising from about 82% to about 99% (w/w) plant-originated substances and additives thereof and about 18% to about 1% (w/w) cultured meat.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1 Hybrid Chicken-Like Sausage

Ingredients:
  A. Soy protein tissue 12 Kg, soy protein isolate 7.25 Kg, sodium caseinate 1.25 Kg, potato starch 7.5 Kg, corn starch 3 Kg;
  B. 75% canola oil, 20% hepatocytes cells and 5% of water, gluten, Guar gum, egg, modified corn starch MC, salt.
* Seasoning step is also optional.
  Step 1—Rehydrated tissue protein: Soy protein tissues are soaked in water for four hours until full absorption of Soy protein and softening.
  Step 2—Brushed: After re-organization of the protein by dry water, a chopping machine brushed is used with low speed, blade speed 1,000 rpm for 2 minutes to give the length and thickness of relatively uniform fibers.
  Step 3—Emulsified: Into the chopping machine ingredients A (isolated soy protein, starch, water, spices) and ingredients B were added using high gear speed, blade speed 5,000 rpm chopping five minutes to achieve fully emulsified mixture.
  Step 4—Vacuum mixing: The emulsion prepared in step 2 of fibrous tissue proteins and Step 3 is placed in a vacuum mixer, fully stirred, for 30 minutes.
  Step 5—Filling: Accomplished by stuffing sausage filling machine is completed, select a breathable plastic casing, smoke treatment may be carried out, casing diameter 18 mm.
  Step 6—Thermal processing: The drying temperature is 58° C., for 10 minutes; smoked temperature 57° C., for 10 minutes; cooking temperature 82° C., 20 minutes to complete the ripening and sterilization process.
  Step 7—Natural cooling to an internal temperature below 10° C.
  Step 8—Packaging & storage. The airtight plastic bag. 0° C. to about 4° C. refrigerated or frozen below −18° C.

Example 2 Vegetarian Beef-Like Sausage

Ingredients:
  A. Soy protein tissue 13 Kg, soy protein isolate 6 Kg, sodium caseinate 1.5 Kg, potato starch 5.5 Kg, corn starch 5 Kg.
  B. 75% canola oil, 20% hepatocytes cells and 5% of water, gluten, Guar gum, egg, MC and salt.
Rehydrated tissue protein—Soy protein tissues were soaked in water for six hours. Soy protein was fully absorbed and become soft.

Example 3 Vegetarian Pork-Like Sausage

Ingredients:
  A. Soy protein 15 Kg, soy protein isolate 6 Kg, sodium caseinate 2 Kg, potato starch 10 Kg.
  B. 75% canola oil, 20% hepatocytes cells and 5% of water, gluten, Guar gum, egg, MC, salt.

Example 4 Hybrid Chicken-Like Nuggets

Ingredients:
  A. Chickpea protein 300 gr, textured wheat protein 100 gr, soy protein isolate 50 gr, water 15 gr, chicken flavor 2 gr, Erythrocytes cells 0.5 gr (~2%), Dijon mustard 3 Tbsp, canola oil 2 Tbsp, corn starch 1 Tsp, dextrose 0.5 Tsp.
  B. Soy milk 25 gr, flavoring 1 Tbsp.
  C. Bread crumbles 50 gr, nutritional yeast 1 Tbsp, flavoring 1 Tbsp.
  Step 1—Into a chopping machine ingredients A are added using high gear speed, blade speed 5,000 rpm chopping five minutes to achieve fully emulsified mixture.
  Step 2—Preparation of nugget sized flatten pieces from the mixture.
  Step 3—The nugget pieces are dipped in ingredients B liquid mixture.
  Step 4—The nugget pieces are dipped in ingredients C breading mixture.
  Step 5—Thermal processing: The frying temperature is 190° C. for 4 minutes. Cooking temperature 82° C., for 20 minutes to complete the ripening and sterilization process.
  Step 6—Natural cooling to an internal temperature below 10° C.
  Step 7—Packaging & storage. An airtight plastic bag. 0° C. to about 4° C. refrigerated or frozen below −18° C.

Example 5 Hybrid Duck-Like Burger

Ingredients:
  A. Soy protein 350 gr, textured wheat protein 100 gr, soy protein isolate 50 gr, adipocytes cells 20 gr (~4%), water 15 gr, coconut oil 10 gr, duck flavor 2 gr, canola oil 2 Tbsp, corn starch 1 Tsp, dextrose 0.5 Tsp.
  Step 1—Into a chopping machine ingredients A are added using high gear speed, blade speed 5,000 rpm chopping five minutes to achieve fully emulsified mixture.
  Step 2—Preparation of flatten patties from the mixture.
  Step 3—Thermal processing: The frying temperature is 190° C. for 4 minutes. Cooking temperature 82° C., for 20 minutes to complete the ripening and sterilization process.
  Step 4—Natural cooling to an internal temperature below 10° C.
  Step 5—Packaging & storage. An airtight plastic bag. 0° C. to about 4° C. refrigerated or frozen below −18° C.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of producing a hybrid foodstuff, the method comprising combining a plant-originated substance selected from the group consisting of a protein and an oil with an amount of cultured animal adipocytes and optionally another type of animal cells so as to enhance a meat organoleptic and/or meat nutritional property in the hybrid foodstuff, wherein said cultured animal adipocytes and optionally another type of animal cells do not form a tissue, wherein said amount is 3-30% (w/w) of the hybrid foodstuff and wherein said cultured animal adipocytes and optionally another type of animal cells are not attached to a scaffold, thereby producing the hybrid foodstuff.

2. The method of claim 1, wherein said amount of said cultured animal adipocytes and optionally another type of animal cells in the hybrid foodstuff is 5-15% (w/w).

3. The method of claim 1, wherein the hybrid foodstuff has the organoleptic properties of a meat product, selected from the group consisting of a chicken, duck, pork and beef.

4. The method of claim 1, wherein said foodstuff is free of growth hormones in an amount hazardous for human or animal consumption.

5. A method of preparing a hybrid foodstuff comprising the steps of:
   providing a plant-originated substance selected from the group consisting of a protein and an oil;
   providing cultured animal adipocytes and optionally another type of animal cells that do not form a tissue, wherein said cultured animal adipocytes and optionally another type of animal cells are not attached to a scaffold;
   combining said plant-originated substance with said cultured animal adipocytes and optionally another type of animal cells so as to obtain a hybrid foodstuff product; and
   shaping said hybrid foodstuff product into a desired form and wherein said amount of said cultured adipocytes and optionally another type of animal cells in the hybrid foodstuff is 3-30% (w/w).

6. The method according to claim 5, wherein said amount of cultured animal adipocytes in the hybrid foodstuff is 5-15% (w/w).

7. A hybrid foodstuff comprising a plant-originated substance and an amount of cultured animal adipocytes and optionally another type of animal cells, wherein said cultured adipocytes do not form a tissue, wherein said amount is 3-30% (w/w) of the hybrid foodstuff and wherein said cultured animal adipocytes and optionally another type of animal cells are not attached to a scaffold and wherein said plant-originated substance is selected from the group consisting of a protein and an oil.

* * * * *